United States Patent [19]

Terpstra et al.

[11] Patent Number: 4,489,909
[45] Date of Patent: Dec. 25, 1984

[54] SAWDUST COLLECTOR BAG FOR A TABLE SAW

[75] Inventors: Daniel A. Terpstra, Kirkwood; Richard Brundage, Ladue, both of

[73] Assignee: Emerson Electric Co., St. Louis, Mo.

[21] Appl. No.: 421,435

[22] Filed: Sep. 22, 1982

Related U.S. Application Data

[62] Division of Ser. No. 217,950, Dec. 19, 1980, Pat. No. 4,367,665.

[51] Int. Cl.³ .............................................. B65B 67/12
[52] U.S. Cl. ........................................................ 248/99
[58] Field of Search ....................... 248/95, 97, 98, 99, 248/100, 101, 74 A, 312.1; 383/33; 150/48

[56] References Cited

U.S. PATENT DOCUMENTS

| 1,183,500 | 5/1916 | Smith | 248/99 |
| 1,356,142 | 10/1920 | Harris, Jr. | 248/97 |
| 2,113,153 | 4/1938 | Jonassen | 248/101 |
| 2,318,853 | 5/1943 | Hall | 248/74 A |
| 2,823,004 | 2/1958 | Melloh | 248/312.1 |
| 2,985,235 | 5/1961 | Landell | 160/348 |
| 4,139,037 | 2/1979 | McGuigan | 248/100 |

FOREIGN PATENT DOCUMENTS 50791  1/1922  Sweden .................. 248/101

Primary Examiner—William H. Schultz
Assistant Examiner—Robert A. Olson
Attorney, Agent, or Firm—Charles E. Markham

[57] ABSTRACT

A sawdust collector bag arranged for convenient detachable connection to walls defining an opening through which sawdust is ejected has a hemmed open end and rods extending through the hem are entered into and resiliently retained in retaining clips spaced along and attached to the walls adjacent the opening.

4 Claims, 4 Drawing Figures

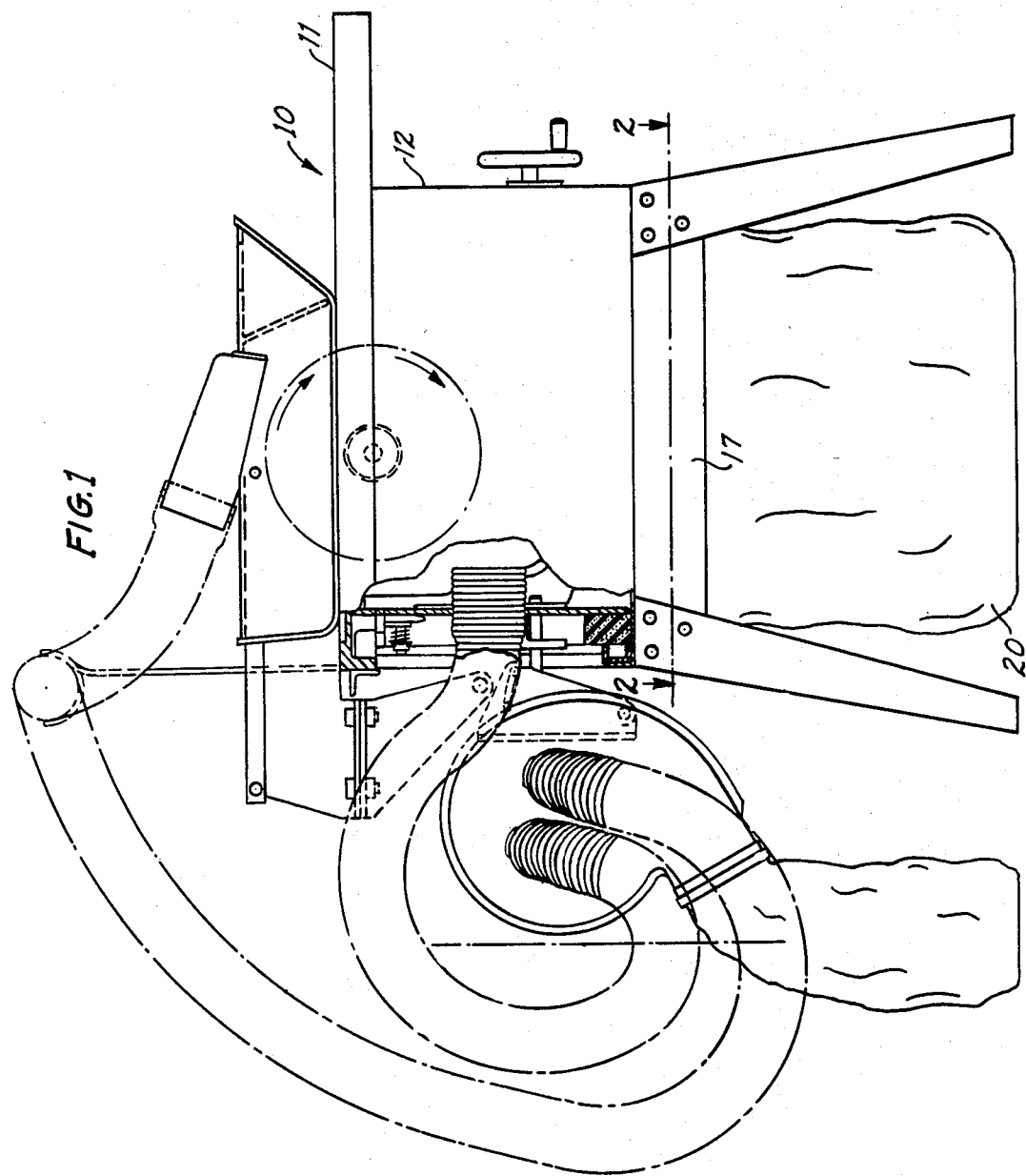

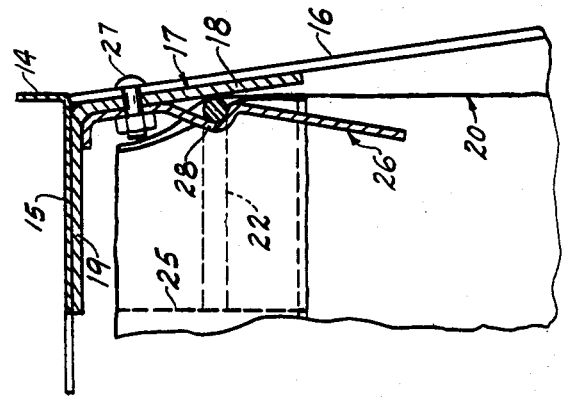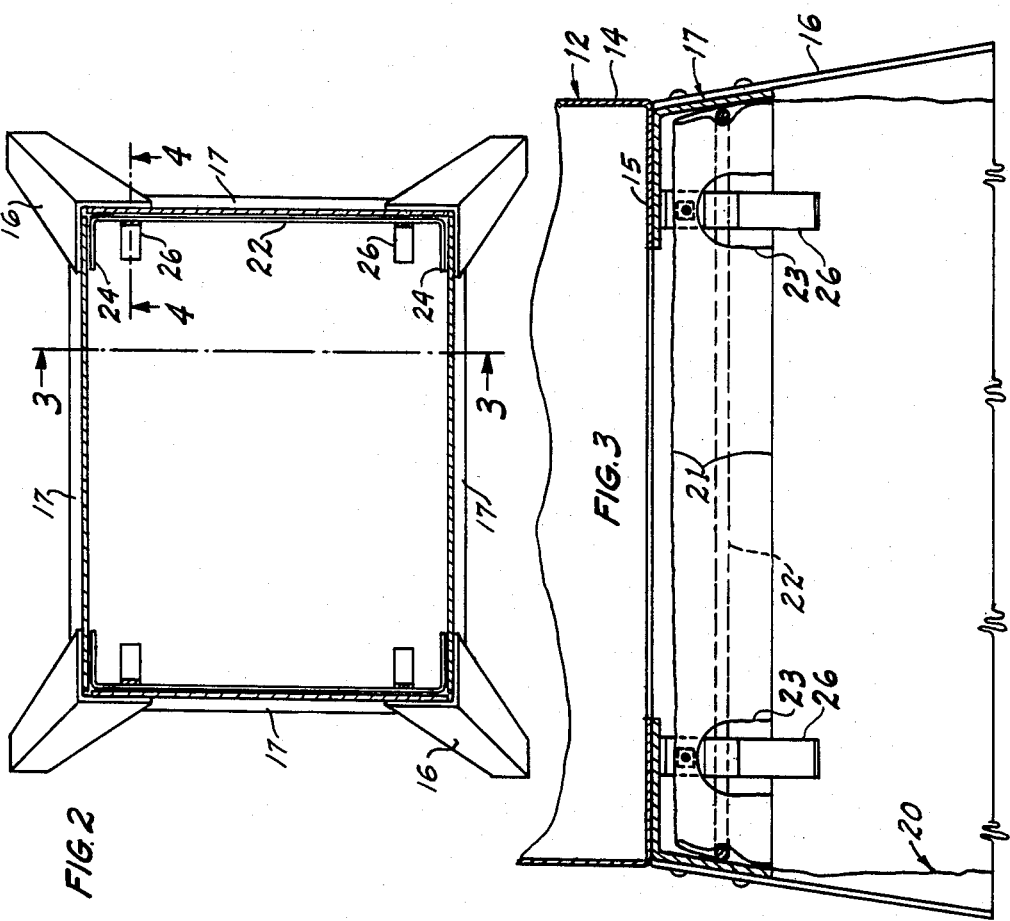

SAWDUST COLLECTOR BAG FOR A TABLE SAW

This application is a division of pending application Ser. No. 06/217,950, filed Dec. 19, 1980, now U.S. Pat. No. 4,367,665.

This invention relates to collector bags for waste material and particularly to means for the convenient detachable connection of the open end of a sawdust collector bag to walls defining an opening through which sawdust is ejected.

OBJECTS OF THE INVENTION

An object of the invention is to provide a waste material collector bag and means for the convenient detachable connection of its open end to the walls defining an opening through which waste material is ejected.

More specifically, it is an object to provide means for the convenient detachable connection of the open end of a sawdust collector bag to vertical walls defining the open bottom base of a table saw which means requires upward movement of the bag for attachment and downward movement for detachment.

Further objects and advantages will appear when reading the following description in connection with the accompanying drawings.

In the drawings;

FIG. 1, is a side elevational view of a table saw with a sawdust collector bag detachably connected to its open bottom base in accordance with the invention;

FIG. 2, is a cross-sectional plan view taken along lines 2—2 of FIG. 1;

FIG. 3, is a fragmentary elevational cross section taken along line 3—3 of FIG. 2; and FIG. 4, is an enlarged fragmentary elevational cross section taken along line 4—4 of FIG. 2.

DESCRIPTION OF A PREFERRED FORM OF THE INVENTION

Referring to the drawings, a table saw generally indicated at 10 has a worktable 11 and a base 12 below the worktable, rectangular in plan, forms a casing enclosing saw tilting and elevating mechanisms. The base has four vertical walls 14 each of which have horizontally inward formed lower edge portions 15 otherwise base 12 is open at the bottom. A leg set rectangular in plan and comprising four legs 16 and four rectangularly arranged leg connecting angle form skirt members 17 space the base 14 from the floor. The rectangularly arranged angle form skirt members 17 each have a substantially vertical leg portion 18 and a horizontal leg portion 19 underlying the horizontally formed base wall portions 15.

A sawdust collector bag 20 has its open upper end hemmed as indicated at 21 with two rods 22 inserted into the hem through suitably spaced cutouts 23 in the hemmed portion. End portions 24 of each rod are formed at 90 degrees and the rods are arranged in the hem so as to hold the open end of the bag in a generally rectangular shape with a pair of hem cutouts 23 on opposite sides thereof. Cross stitching at points 25 closes the hem at these points to maintain proper positioning of the rods 22. Elongated, vertically arranged clip members 26 are attached at their upper ends to the inner surface of leg portions 18 of two opposite skirt members 17 by bolts 27 and have substantially the same spacing as hem cutouts 23. Also, the peripheral length of the hemmed open end of bag 20 is substantially equivalent to the peripheral length of the rectangle formed by the inner surfaces of the vertical leg portions 18 of skirt members 17.

The clip members 26 are formed so as to provide a rod receiving and retaining notch 28 immediately below their point of attachment and are further formed downwardly of said notch so as to flare outwardly from the inner surface of leg portions 18 so as to provide easy upward entry of the rods 22 into the retaining notches 28.

In mounting the collector bag 20 the open end thereof with the rods inserted in the hem is positioned so that cutouts 23 are aligned with clip members 26. The bag is then moved upward with the flared lower portions of clips 26 passing through cutouts 23 and over those exposed portions of rods 22 which extend across the cutouts. Further upward movement enters the rods into the retaining notches 28 whereby the open end of the bag is resiliently retained with the flared lower ends of clips 26 extending inside of the bag, see FIG. 4.

It will be understood by those skilled in this art that the resiliency and resistance to a downward force tending to dislodge the rods from the retaining notches may be readily varied to suit conditions by varying the dimensions or the material of which clip members 22 are constructed. Also, it will occur to those skilled in this art that the means described for the convenient detachable connection of the sawdust collector bag may be employed in connecting the open end of a waste material collector bag to the walls of any port through which waste material is ejected.

We claim:

1. A collector bag and means for conveniently detachably connecting the open end thereof to the inner surface of vertical walls defining a downwardly directed opening through which waste material is ejected, said bag having a closed end and an open end, said open end being hemmed and arranged to extend upward into said opening, means resiliently holding a substantial portion of the hemmed periphery of said open end against said vertical walls comprising rod means in said hem extending longitudinally a substantial portion of the periphery of said hemmed open end, a plurality of spaced cutout portions of said hemmed open end to expose portions of said rod means, and a plurality of spaced clip elements attached to said walls and having the same spacing as said cutout portions for receiving and resiliently retaining said exposed portions of said rod means as said open end of said bag is moved upward into said opening, said clip elements each being elongated and vertically arranged on said walls and having an upper portion lying against and connected to one of said walls, an intermediate rod receiving notch formed therein adjacent said connected portion, and a lower portion diverging downward from said wall so as to provide a convenient approach to said retaining notch as said rod means in the hemmed open end of said bag is moved upward into said opening.

2. A collector bar and means for conveniently detachably connecting the open end thereof to the inner surfaces of the opposite two of four vertical walls defining a downwardly directed rectangular opening through which waste material is ejected, said bag having a closed end and an open end and said open end having substantially the same peripheral length as the four walls defining said opening, said open end of said bag being hemmed, a pair of rods arranged in said hem so as to lie against said opposite walls and being of substantially the same length as said opposite walls, said hemmed open end of said bag having a plurality of cutout portions exposing portions of said rods, and a plurality of clip elements attached to said opposite walls for receiving and resiliently retaining said exposed portions of said rods as said open end of said bag is moved upward into said opening, said clip elements each being elongated and vertically arranged on said opposite vertical walls and having an upper end portion lying against and connected to one of said opposite walls, and an intermediate rod receiving and retaining notch formed therein adjacent said connected portion, and a lower end portion diverging from said wall so as to provide a convenient approach to said notch as said rod and said open end of said bag are moved upward into said opening.

3. The arrangement claimed in claim 2 in which said rods have end portions formed at 90 degrees and extending along the other two of said four walls.

4. The arrangement claimed in claim 2 in which said hem is closed by stitching at spaced points therealong so as to retain said rods in position.

* * * * *